United States Patent
Park et al.

(10) Patent No.: US 8,049,396 B2
(45) Date of Patent: Nov. 1, 2011

(54) PIEZOELECTRIC ULTRASONIC MOTOR AND METHOD OF MANUFACTURING THE SAME

(75) Inventors: Sung-hyuk Park, Yongin-si (KR); Jin-woo Cho, Seongnam-si (KR); Ji-hyuk Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 12/535,019

(22) Filed: Aug. 4, 2009

(65) Prior Publication Data

US 2010/0194242 A1     Aug. 5, 2010

(30) Foreign Application Priority Data

Feb. 3, 2009   (KR) ..................... 10-2009-0008536

(51) Int. Cl.
*H02N 2/12*   (2006.01)
(52) U.S. Cl. ............................. 310/323.01; 310/323.03
(58) Field of Classification Search ............ 310/323.01–323.21, 345
See application file for complete search history.

(56) References Cited

U.S. PATENT DOCUMENTS

| | | | | |
|---|---|---|---|---|
| RE36,337 E | * | 10/1999 | Kawai | 310/323.06 |
| 5,990,597 A | * | 11/1999 | Takagi et al. | 310/323.04 |
| 6,150,749 A | * | 11/2000 | Tamai et al. | 310/323.12 |
| 6,211,603 B1 | | 4/2001 | Iino et al. | |

FOREIGN PATENT DOCUMENTS

| | | |
|---|---|---|
| JP | 3-74182 A | 3/1991 |
| JP | 4-347583 A | 12/1992 |
| JP | 4-347584 A | 12/1992 |
| JP | 4-347585 A | 12/1992 |
| JP | 5-76189 A | 3/1993 |
| JP | 7-298648 A | 11/1995 |
| KR | 10-0178735 B1 | 11/1998 |

\* cited by examiner

*Primary Examiner* — Derek Rosenau
(74) *Attorney, Agent, or Firm* — Sughrue Mion, PLLC

(57) ABSTRACT

A piezoelectric ultrasonic motor and a method of manufacturing the piezoelectric ultrasonic motor. The piezoelectric ultrasonic motor includes: a piezoelectric body that generates a traveling wave according to an applied voltage signal; a vibrator that is attached to the piezoelectric body and vibrates; and a rotator that contacts the vibrator and is rotated by friction with the vibrating vibrator, wherein the rotator includes a plate spring member having a contact portion that contacts the vibrator, a support member that is coupled to the plate spring member and supports the plate spring member, and a buffer space defined by the plate spring member and the support member.

6 Claims, 2 Drawing Sheets

PIEZOELECTRIC ULTRASONIC MOTOR AND METHOD OF MANUFACTURING THE SAME

CROSS-REFERENCE TO RELATED APPLICATION

This application claims the benefit of Korean Patent Application No. 10-2009-0008536, filed on Feb. 3, 2009 in the Korean Intellectual Property Office, the disclosure of which is incorporated herein in its entirety by reference.

BACKGROUND

1. Field

One or more embodiments relate to a piezoelectric ultrasonic motor having a driving force due to friction between a vibrator and a rotator, and a method of manufacturing the piezoelectric ultrasonic motor.

2. Description of the Related Art

A piezoelectric ultrasonic motor is a motor that is rotated by friction between a vibrator and a rotator and is driven by applying an ultrasonic driving voltage at a frequency of 20 kHz or greater, which humans cannot detect. Unlike a high speed and high torque electromagnetic motor, the piezoelectric ultrasonic motor has a low speed and a high torque, and may be driven without any additional deceleration gear. Further, the piezoelectric ultrasonic motor has a self-braking function due to frictional force, and does not generate electronic waves since coils or magnetic bodies are not used. Further, precision control may be conducted by using the piezoelectric ultrasonic motor, and the piezoelectric ultrasonic motor may be easily applied to systems, such as precision machines, due to the compact size of the piezoelectric ultrasonic motor. The piezoelectric ultrasonic motor can be used in fields such as robots, medical equipment, cameras, semiconductor testing equipment, building automation equipment, etc. which use super-precision position control.

A rotator and a vibrator of a general piezoelectric ultrasonic motor are manufactured using a metal cutting process, and include a spring structure in contacting bodies where the flatness of a frictional surface of the vibrator is not uniform, in order to maintain uniform friction by pressing the vibrator against the rotator. However, the spring structure of the rotator formed by a cutting process has a complicated shape and a small thickness, and thus, it is difficult to manufacture the spring structure and to control the flatness of the rotator.

Further, in order to increase the resistance of the rotator to abrasion, a thin anti-abrasion coating layer may be formed on surfaces of the vibrator and the rotator. However, when metal is cut to form the spring structure, a burr is generated, and if the anti-abrasion layer is formed without post-process to remove the burr, it is difficult to form the anti-abrasion layer with a uniform thickness. Thus, the anti-abrasion layer can be partially damaged and the anti-abrasion characteristics of the rotator are deteriorated, thereby increasing driving noise and decreasing the efficiency of the piezoelectric ultrasonic motor.

SUMMARY

One or more embodiments include a piezoelectric ultrasonic motor having a rotator with which deterioration of the anti-abrasion characteristics of the rotator and the vibrator may be prevented and manufacturing costs and time may be reduced, and a method of manufacturing the piezoelectric ultrasonic motor.

Additional aspects will be set forth in part in the description which follows and, in part, will be apparent from the description, or may be learned by practice of the presented embodiments.

One or more embodiments may include a piezoelectric ultrasonic motor including: a piezoelectric body that generates a traveling wave according to an applied voltage signal; a vibrator that is attached to the piezoelectric body and vibrates; and a rotator that contacts the vibrator and is rotated by friction with the vibrating vibrator, wherein the rotator includes a plate spring member having a contact portion that contacts the vibrator, a support member that is coupled to the plate spring member and supports the plate spring member, and a buffer space defined by the plate spring member and the support member.

Each of the piezoelectric body, the vibrator, and the rotator may be ring-shaped.

Both lateral edges of the plate spring member may be coupled to the support member, and the contact portion may be formed in a bent portion between the lateral edges that are coupled to the support member.

The contact portion may have a curved cross-section.

The plate spring member and the support member may have different natural frequencies.

An elastic material or an anti-abrasion material may be interposed in a coupling portion of the plate spring member and the support member to suppress noise or abrasion between the plate spring member and the support member.

The plate spring member may further include an anti-abrasion coating layer on a surface of the contact portion that contacts the vibrator.

One or more embodiments may include a method of manufacturing a piezoelectric ultrasonic motor, the method including: attaching a vibrator to a piezoelectric body that generates a traveling wave according to an applied voltage signal; forming a rotator that is rotated by friction with the vibrator; and contacting the rotator to the vibrator, wherein the forming of the rotator includes forming a plate spring member having a contact portion that contacts the vibrator and coupling the plate spring member to a support member.

The plate spring member may be formed by die-casting a metal or pressing a metal plate.

The forming of the plate spring member may include forming the contact portion with a curved cross-section.

The forming of the plate spring member may include forming an anti-abrasion coating layer on a surface of the contact portion.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
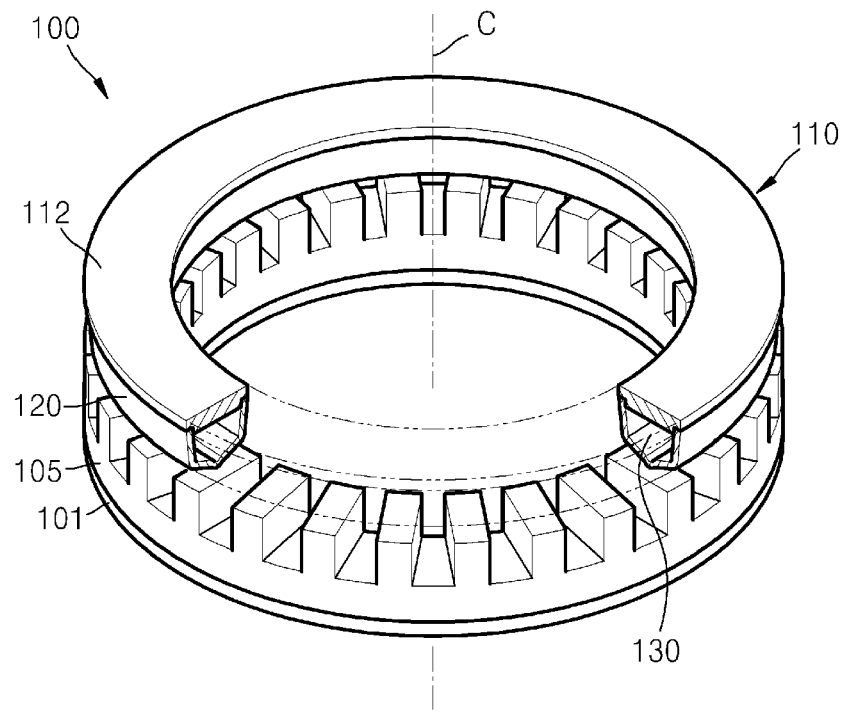
FIG. 1 is a partial cut-away perspective view illustrating a portion of a piezoelectric ultrasonic motor according to an embodiment.

Reference will now be made in detail to embodiments, examples of which are illustrated in the accompanying drawings, wherein like reference numerals refer to the like elements throughout. In this regard, the embodiments may have different forms and should not be construed as being limited to the descriptions set forth herein. Accordingly, the embodiments are merely described below, by referring to the figures, to explain aspects of the present description.

Figure 2:
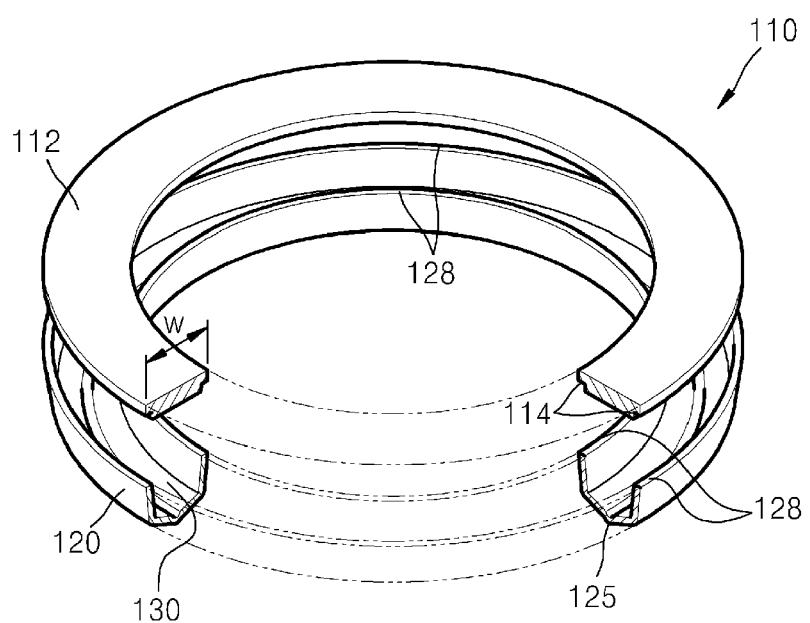
FIG. 2 is a partial cut-away perspective view illustrating contacting bodies of FIG. 1.
Figure 3:
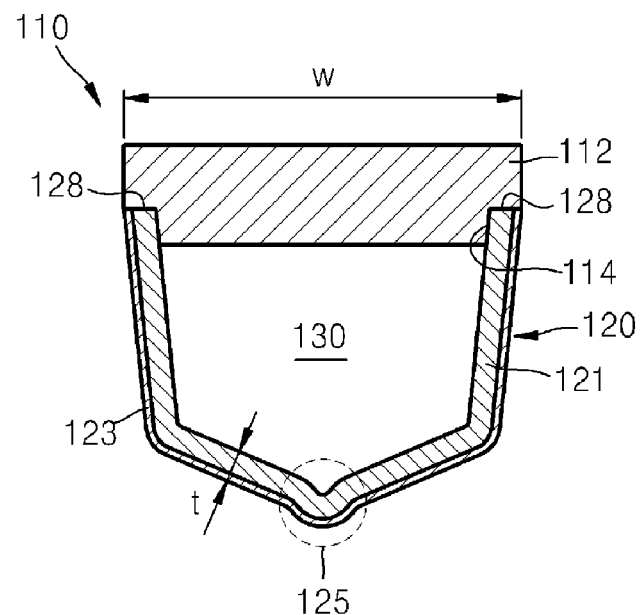
FIG. 3 is a cross-sectional view of the contacting bodies of FIG. 2.
Figure 4:
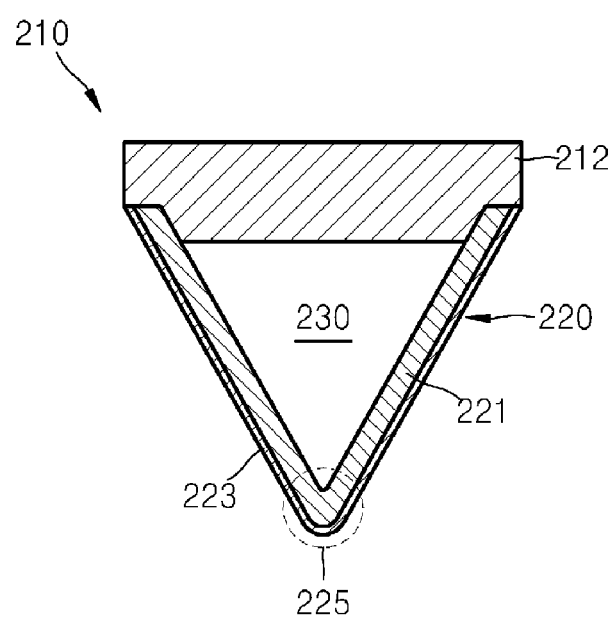
FIG. 4 is a cross-sectional view illustrating another example of the contacting bodies of FIG. 2.

FIG. 1 is a partial cut-away perspective view illustrating a portion of a piezoelectric ultrasonic motor 100 according to an embodiment. FIG. 2 is a partial cut-away perspective view illustrating contacting bodies of FIG. 1. FIG. 3 is a cross-sectional view of the contacting bodies of FIG. 2. FIG. 4 is a cross-sectional view illustrating another example of the contacting bodies of FIG. 2.

Referring to FIGS. 1 through 3, the piezoelectric ultrasonic motor 100 includes a piezoelectric body 101, a vibrator 105 attached to the piezoelectric body 101, and a rotator 110 contacting the vibrator 105. The piezoelectric body 101, the vibrator 105, and the rotator 110 of the piezoelectric ultrasonic motor 100 are ring-shaped and the piezoelectric ultrasonic motor 100 is also completely ring-shaped. Thus, the piezoelectric ultrasonic motor 100 may be referred to as a ring-shaped piezoelectric ultrasonic motor or a hollow piezoelectric ultrasonic motor.

The piezoelectric body 101 is vibrated by applying an ultrasonic driving voltage at a frequency of 20 kHz or greater. The vibration of the piezoelectric body 101 forms a traveling wave in a circumferential direction of the ring-shaped piezoelectric body 101. The vibrator 105 is vibrated by the vibration of the piezoelectric body 101. The vibrator 105 may be formed of a metal such as stainless steel or phosphor bronze.

The rotator 110 contacts the vibrator 105 and is rotated about a rotation center C by friction with the vibrator 105 generated due to the vibration of the piezoelectric body 101. In detail, a traveling wave formed by the vibration of the vibrator 105 travels in a circumferential direction of the ring-shaped vibrator 105, and the rotator 110 moves in the direction of the traveling wave and is finally rotated about the rotation center C. The rotation direction of the rotator 110 is converted clockwise or anti-clockwise according to the polarity of a driving voltage applied to the piezoelectric body 101.

The rotator 110 includes a plate spring member 120 having a contact portion 125 contacting the vibrator 105, a support member 112 coupled to the plate spring member 120 to support the plate spring member 120, and a buffer space 130 defined by the plate spring member 120 and the support member 112. The plate spring member 120 may be formed of a metal such aluminum and has a predetermined thickness t. The plate spring member 120 includes a spring body 121, which is bent so that a ring-shaped gully is formed thereby, and an anti-abrasion coating layer 123 formed on an outer surface of the spring body 121. The spring body 121 may be formed in a form corresponding to that of the spring body 121, as illustrated in FIG. 2, by die-casting a metal or pressing a metal plate. However, the method of forming the spring body 121 is not limited to the die-casting or pressing, and other various methods may also be used.

Two lateral edges 128 of the plate spring member 120 are coupled to the support member 112 and the contact portion 125 that is bent to protrude to the outside is formed in a portion of the plate spring member 120 between the two lateral edges 128. A cross-section of the contact portion 125 is curved, as illustrated in FIG. 3, in order to mitigate shock concentration during contact friction with the vibrator 105, and also to mitigate abrasion due to the contact between the plate spring member 120 and the vibrator 105. Also, the spring body 121 including the contact portion 125 is formed without using a cutting process, and thus the anti-abrasion coating layer 123 may be formed with a uniform thickness and without requiring any post-processing.

The support member 112 is ring-shaped with a predetermined width w, and includes mounting grooves 114 to which the lateral edges 128 of the plate spring member 120 are correspondingly mounted and coupled. The support member 112 may be formed of rubber or a metal such as steel. The support member 112 and the plate spring member 120 may be formed of materials having different natural frequencies so that unnecessary resonance is prevented to thereby reduce noise and vibration.

The plate spring member 120 may be fixedly coupled to the support member 112 in other various manners. For example, although not clearly illustrated in FIG. 3, the plate spring member 120 may be fixedly coupled to the support member 112 by adhering the mounting grooves 114 and the lateral edges 128 using an adhesive, by fixing the lateral edges 128 to the mounting grooves 114 using bolts, or by forming a protrusion in one of the mounting grooves 114 and the lateral edge 128 and a groove in the other to receive the protrusion. Although not illustrated in FIG. 3, in order to suppress noise or abrasion between the plate spring member 120 and the support member 112 during an operation of the piezoelectric ultrasonic motor 100, an elastic body or an anti-abrasion material may be interposed in a coupling portion of the plate spring member 120 and the support member 112.

The buffer space 130 is formed in the rotator 110 as the plate spring member 120 and the support member 112 are coupled to each other. As the buffer space 130 is formed, the plate spring member 120 is elastic and resilient to maintain its original shape even when the contact portion 125 of the plate spring member 120 and the vibrator 105 contact abnormally. Accordingly, a uniform pressure is maintained between the vibrator 105 and the plate spring member 120 when they contact each other.

The piezoelectric ultrasonic motor 100 may alternatively include a rotator 210 as illustrated in FIG. 4 instead of the rotator 110 illustrated in FIG. 3. The rotator 210 illustrated in FIG. 4 shares some common characteristics with the rotator 110 of FIG. 3 and thus hereinafter, the description will focus on differences therebetween.

Referring to FIG. 4, like the rotator 110 of FIG. 3, the rotator 210 also includes a plate spring member 220 having a contact portion 225 contacting the vibrator 105, a support member 212 that is coupled to the plate spring member 220 to support the plate spring member 220, and a buffer space 230 defined by the plate spring member 220 and the support member 212. The plate spring member 220 includes a spring body 221 and an anti-abrasion coating layer 223 formed on an outer surface of the spring body 221. The contact portion 225 of the rotator 210 has a curved cross-section and is completely V-shaped. Accordingly, when pressing a metal plate or die-casting a metal to form the spring body 221, it is easy to manufacture a mold for the spring body 221 as a cross-section of the spring body 221 has a simpler form than that of the spring body 121 illustrated in FIG. 3, thereby reducing manufacturing costs.

Hereinafter, a method of manufacturing the piezoelectric ultrasonic motor 100 will be described with reference to FIGS. 1 through 3. The method of manufacturing the piezoelectric ultrasonic motor 100 includes attaching the vibrator 105 to the piezoelectric body 101, forming the rotator 110, and contacting the rotator 110 to the vibrator 105. The forming of the rotator 110 includes forming the plate spring member 120 including the contact portion 125 and coupling the plate spring member 120 to the support member 112. The forming of the plate spring member 120 includes forming the spring body 121 and forming the anti-abrasion coating layer 123 on the outer surface of the spring body 121. Accordingly, the anti-abrasion coating layer 123 is formed on a surface of the contact portion 125, which contacts the vibrator 105.

Also, the forming of the plate spring member 120 may include forming a curved cross-section of the contact portion 125. Thus, the spring body 121 having the contact portion 125 that has a curved cross-section may be formed. In detail, the spring body 121 having the contact portion 125 with the curved cross-section may be formed by pressing a metal plate or die-casting a metal such that the cross-section of the contact portion 125 is curved. The plate spring member 120 and the support member 112 have been described above and thus descriptions thereof will not be repeated.

It should be understood that the embodiments described herein should be considered in a descriptive sense only and not for purposes of limitation. Descriptions of features or aspects within each embodiment should be considered as available for other similar features or aspects in other embodiments.

What is claimed is:

1. A piezoelectric ultrasonic motor comprising:
   a piezoelectric body that generates a traveling wave according to an applied voltage signal;
   a vibrator that is attached to the piezoelectric body and vibrates; and
   a rotator that contacts the vibrator and is rotated by friction with the vibrating vibrator,
   wherein the rotator comprises:
      a plate spring member having a contact portion that contacts the vibrator,
      a support member that is coupled to the plate spring member and supports the plate spring member, and
      a buffer space defined by the plate spring member and the support member,
   wherein lateral edges of the plate spring member are coupled to the support member and the contact portion is a bent portion between the lateral edges that are coupled to the support member.

2. The piezoelectric ultrasonic motor of claim 1, wherein each of the piezoelectric body, the vibrator, and the rotator is ring-shaped.

3. The piezoelectric ultrasonic motor of claim 1, wherein the contact portion has a curved cross-section.

4. The piezoelectric ultrasonic motor of claim 1, wherein the plate spring member and the support member are formed of different materials which have different natural frequencies.

5. The piezoelectric ultrasonic motor of claim 1, wherein at least one of an elastic material and an anti-abrasion material is interposed between the plate spring member and the support member to suppress noise or abrasion between the plate spring member and the support member.

6. The piezoelectric ultrasonic motor of claim 1, wherein the plate spring member further comprises an anti-abrasion coating layer formed on a surface of the contact portion contacting the vibrator.

* * * * *